(12) United States Patent
Kurioka

(10) Patent No.: US 8,564,890 B2
(45) Date of Patent: *Oct. 22, 2013

(54) LENS SYSTEM, INTERCHANGEABLE LENS APPARATUS, AND CAMERA SYSTEM

(71) Applicant: Panasonic Corporation, Osaka (JP)

(72) Inventor: Yoshiaki Kurioka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/769,516

(22) Filed: Feb. 18, 2013

(65) Prior Publication Data

US 2013/0162889 A1    Jun. 27, 2013

Related U.S. Application Data

(62) Division of application No. 12/869,957, filed on Aug. 27, 2010, now Pat. No. 8,400,719.

(30) Foreign Application Priority Data

Aug. 31, 2009   (JP) ................................. 2009-199702

(51) Int. Cl.
  *G02B 9/00*  (2006.01)
  *G02B 9/08*  (2006.01)
  *G02B 9/60*  (2006.01)

(52) U.S. Cl.
  USPC .......................................... 359/740; 359/764

(58) Field of Classification Search
  USPC ........................... 359/740, 764, 755, 714, 713
  See application file for complete search history.

(56) References Cited

U.S. PATENT DOCUMENTS

| | | | |
|---|---|---|---|
| 5,546,236 A | 8/1996 | Ogata et al. | |
| 6,549,343 B2 | 4/2003 | Yoneyama | |
| 8,400,719 B2 * | 3/2013 | Kurioka | 359/764 |
| 2002/0159163 A1 | 10/2002 | Takatsuki | |
| 2009/0273851 A1 | 11/2009 | Take et al. | |
| 2010/0091174 A1 | 4/2010 | Miyazaki et al. | |

FOREIGN PATENT DOCUMENTS

| | | |
|---|---|---|
| JP | 63-096619 A | 4/1988 |
| JP | 02-023309 A | 1/1990 |
| JP | 06-265781 A | 9/1994 |
| JP | 07-104181 A | 4/1995 |
| JP | 08-171050 A | 7/1996 |
| JP | 2000-019393 A | 1/2000 |
| JP | 2002-250863 A | 9/2002 |

\* cited by examiner

*Primary Examiner* — Alicia M Harrington
(74) *Attorney, Agent, or Firm* — Pearne & Gordon LLP

(57) ABSTRACT

It has conventionally been difficult to reduce the size of a fast lens system having an F number of about 1.4 to 2.4. In a lens system of the present invention, a positive lens element is disposed closest to an object side. A diaphragm is disposed in a widest air space in the lens system. The lens system of the present invention satisfies the following conditions:

$$0.05 < L\_1/L\_TH < 0.21$$

$$1.5 < L\_TH/Y < 8$$

where

L_1 is an interval from a lens surface located closest to the object side to a lens surface located on the object side relative to the diaphragm;

L_TH is an interval from the lens surface located closest to the object side to a lens surface located closest to an image side; and Y is a maximum image height.

16 Claims, 12 Drawing Sheets

US 8,564,890 B2

LENS SYSTEM, INTERCHANGEABLE LENS APPARATUS, AND CAMERA SYSTEM

This application is a division of U.S. patent application Ser. No. 12/869,957 filed on Aug. 27, 2010 and issued as U.S. Pat. No. 8,400,719 on Mar. 19, 2013, which is incorporated herein by reference in its entirety.

BACKGROUND OF THE INVENTION

1. Field of the Invention

The present invention relates to a single-focal-length imaging lens system that is applicable to an imaging optical system, particularly, an interchangeable lens or a digital still camera.

2. Description of the Background Art

With the growing popularity of cameras, lenses of various specifications have been proposed. Prior art documents proposing lens systems having F numbers ranging from about 1.4 to 2.4 are as follows: Japanese Laid-Open Patent Publication No. 63-96619, Japanese Laid-Open Patent Publication No. 2-23309, Japanese Laid-Open Patent Publication No. 8-171050, Japanese Laid-Open Patent Publication No. 2000-19393, and Japanese Laid-Open Patent Publication No. 2002-250863.

SUMMARY OF THE INVENTION

Hereinafter, the above prior art documents and problems thereof will be described.

In the lens system disclosed in Japanese Laid-Open Patent Publication No. 63-96619, a lens unit disposed before a diaphragm is constituted by a single lens, whereas a lens unit disposed after the diaphragm is very large in size, resulting in an increase in the total length of the entire lens system.

In the lens system disclosed in Japanese Laid-Open Patent Publication No. 2-23309, a chromatic aberration is actively compensated by using a GRIN lens. Although a diaphragm, which is increased in size when used in a large-diameter lens system, is disposed in a widest air space in the lens system, the distance from a lens surface closest to an object side to the space where the diaphragm is disposed is long, resulting in an increase in the size of the lens system.

In the lens system disclosed in Japanese Laid-Open Patent Publication No 8-171050, two GRIN lenses are used to reduce the number of lens elements. This lens system is reduced in size by disposing the two GRIN lenses in a space from an object to a diaphragm. However, the length of a lens unit from a lens surface closest to an object side to a lens surface located on the object side relative to a diaphragm is increased relative to the total length of the lens system, resulting in an increase in the total length of the lens system.

A GRIN lens is a lens for compensating an aberration by utilizing gradient index distribution inside the lens. However, it is difficult to manufacture a base material thereof prior to processing, as compared with a spherical lens or an aspheric lens. Accordingly, a lens system having such GRIN lens is currently not popular.

In the lens systems disclosed in Japanese Laid-Open Patent Publication No. 2000-19393 and Japanese Laid-Open Patent Publication No. 2002-250863, although a diaphragm, which is increased in size when used in a large-diameter lens system, is disposed in a widest air space in the lens system, the entire lens system is significantly increased in size.

An object of the present invention is to provide a compact and fast lens system having an F number of about 1.4 to 2.4.

A lens system according to the present invention is suitable for size reduction of a fast lens system having an F number of about 1.4 to 2.4, in which a lens element closest to an object side is a positive lens element and a diaphragm is disposed in a widest air space in the lens system. The lens system satisfies the following conditions:

$$0.05 < L\_1/L\_TH < 0.21$$

$$1.5 < L\_TH/Y < 8$$

where, $L\_1$ is an interval from a lens surface located closest to the object side to a lens surface located on the object side relative to the diaphragm (a length of a front unit including all lens elements that are disposed on the object side relative to the diaphragm), $L\_TH$ is an interval from the lens surface located closest to the object side to a lens surface located closest to an image side, and $Y$ is a maximum image height.

Further, a lens system according to the present invention has an F number equal to or smaller than 2.4, and includes two or more lens elements each having a refractive index equal to or greater than 1.85. The lens system satisfies the following condition:

$$1.5 < L\_TH/Y < 8$$

According to the present invention, it is possible to provide a compact and fast lens system having an F number of about 1.4 to 2.4.

These and other objects, features, aspects and advantages of the present invention will become more apparent from the following detailed description of the present invention when taken in conjunction with the accompanying drawings.

DESCRIPTION OF THE PREFERRED EMBODIMENTS

In FIGS. 1 to 11, (a) shows a lens arrangement diagram, and (b) shows longitudinal aberration diagrams in an infinity in-focus condition. In each lens arrangement diagram (a), an asterisk "*" imparted to a particular surface indicates that the surface is aspheric. A straight line located on the most right-hand side indicates the position of an image surface S. A symbol A in the lens system indicates a diaphragm. Lens elements constituting the lens system are given numbers L1, L2, . . . in order from a lens element located closest to an object side to a lens element located closest to an image side.

Further, in the present specification, a lens unit from a lens surface located closest to the object side to a lens surface located on the object side relative to the diaphragm is referred to as a front unit, and a lens unit from a lens surface located on the image side relative to the diaphragm to a lens surface located closest to the image side is referred to as a rear unit.

Hereinafter, preferred embodiments of the present invention will be described with reference to the drawings.

Each of lens systems according to Embodiments 1 to 11 of the present invention has an F number of 1.4 to 2.4, and includes, in order from the object side toward the image side, a front unit including two lens elements, i.e., a positive lens element and a negative lens element, and a rear unit having a positive power. The rear unit includes at least one negative lens element and at least one aspheric surface. A diaphragm A is disposed in a widest air space in the lens system.

Embodiment 1

Figure 1:
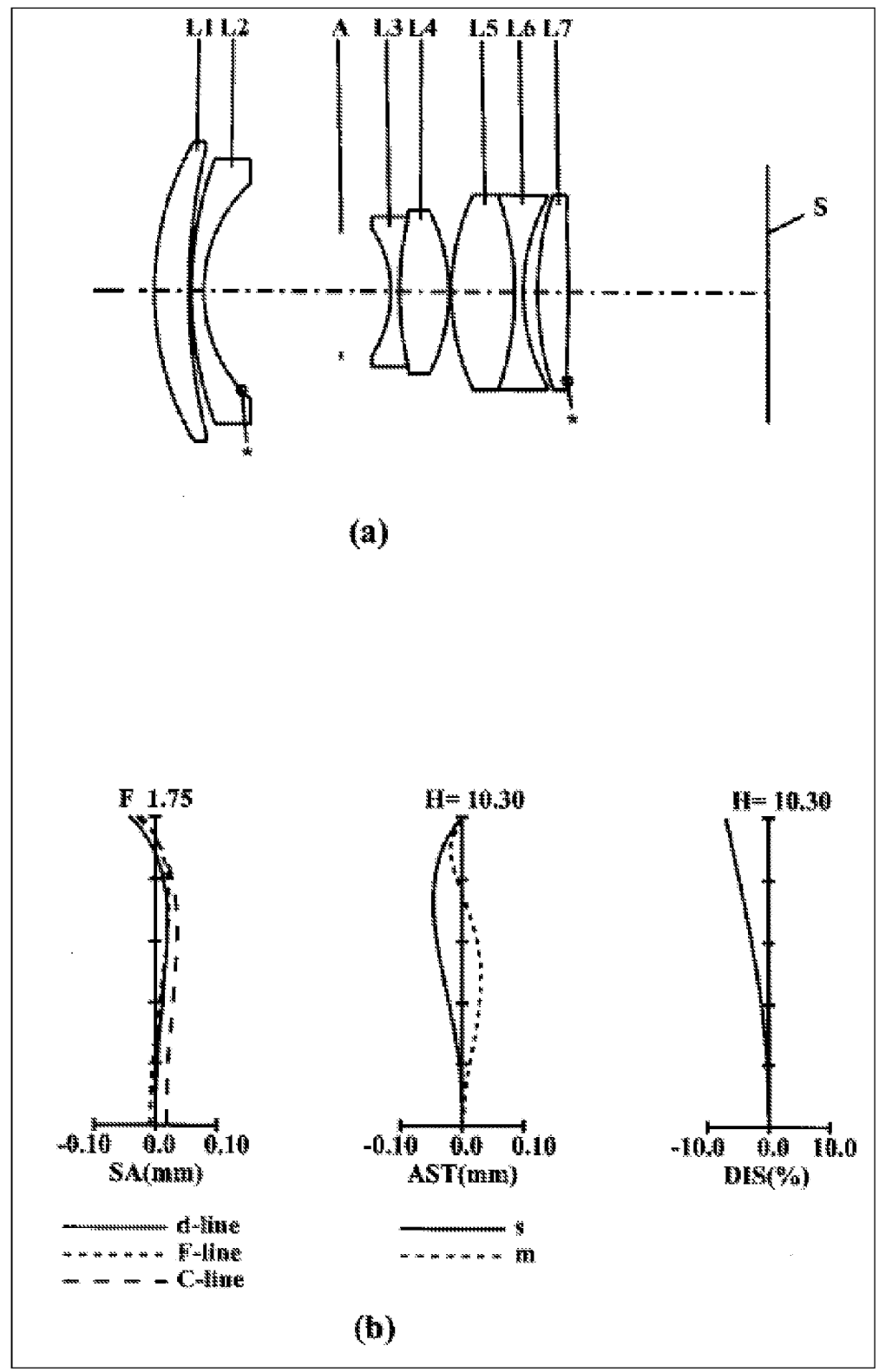
FIG. 1 is a diagram according to Embodiment 1 (Example 1), wherein (a) shows a lens arrangement diagram, and (b) shows longitudinal aberration diagrams.

A lens system shown in FIG. 1 has a front unit that includes, in order from the object side toward the image side, a spherical positive lens element L1 and a negative lens element L2 having an aspheric surface on its object side. A rear unit having a positive power is disposed at the object side relative to the front unit. The rear unit includes two negative lens elements and three positive lens elements. More specifically, the rear unit includes, in order from the object side toward the image side, a cemented lens element including a negative lens element L3 and a positive lens element L4, a cemented lens element including a positive lens element L5 and a negative lens element L6, and a positive lens element L7 having a refractive index of 1.69 and having an aspheric surface on its image side. At the time of focusing from an infinity in-focus condition to a close-point in-focus condition, the entire lens system moves toward the object side along the optical axis.

Embodiment 2

Figure 2:
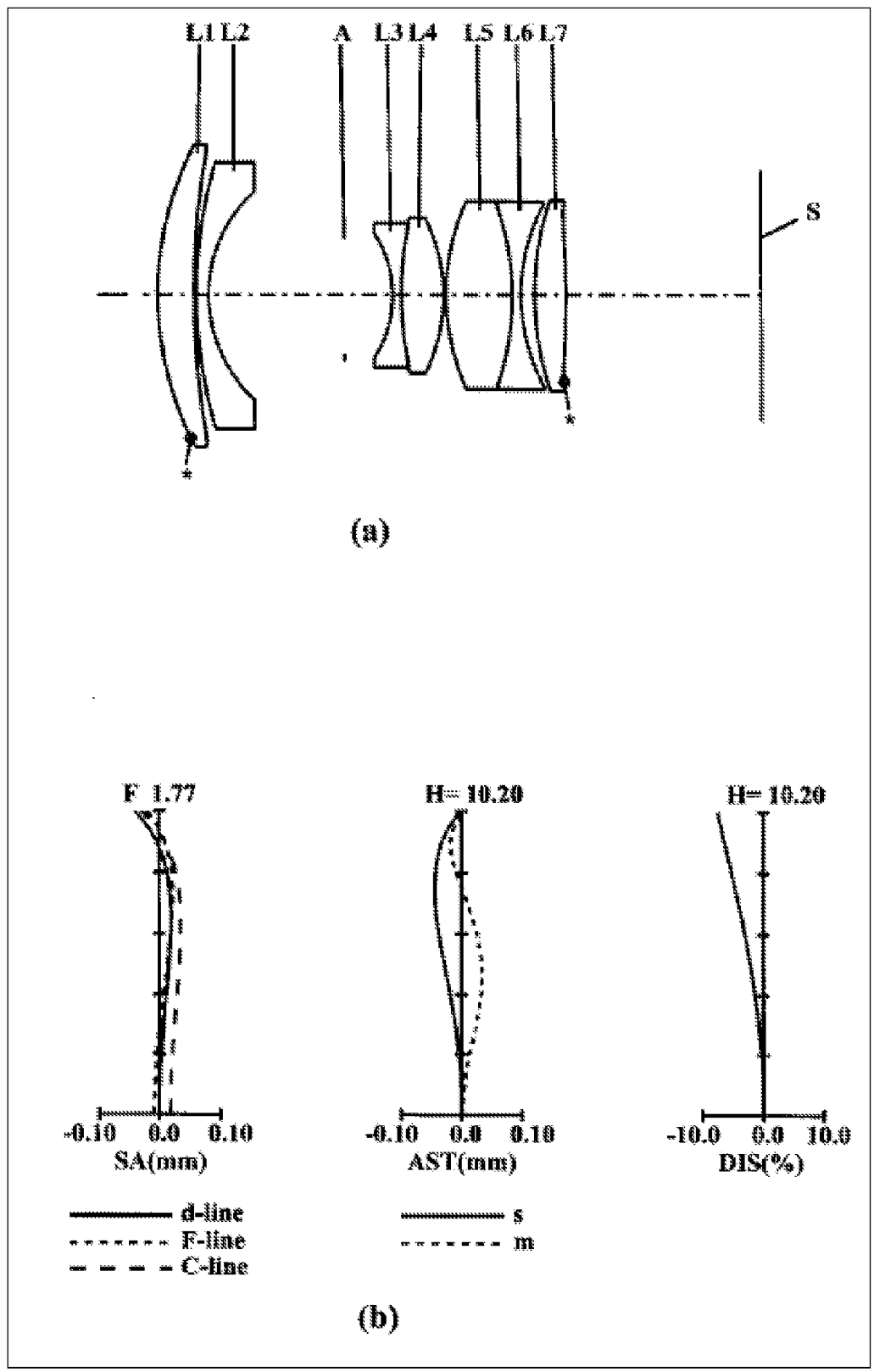
FIG. 2 is a diagram according to Embodiment 2 (Example 2), wherein (a) shows a lens arrangement diagram, and (b) shows longitudinal aberration diagrams.

A lens system shown in FIG. 2 has a front unit including, in order from the object side toward the image side, a positive lens element L1 having an aspheric surface, and a spherical negative lens element L2 having a negative power. An aspheric lens element L7 is disposed closest to the image side.

Embodiment 3

Figure 3:
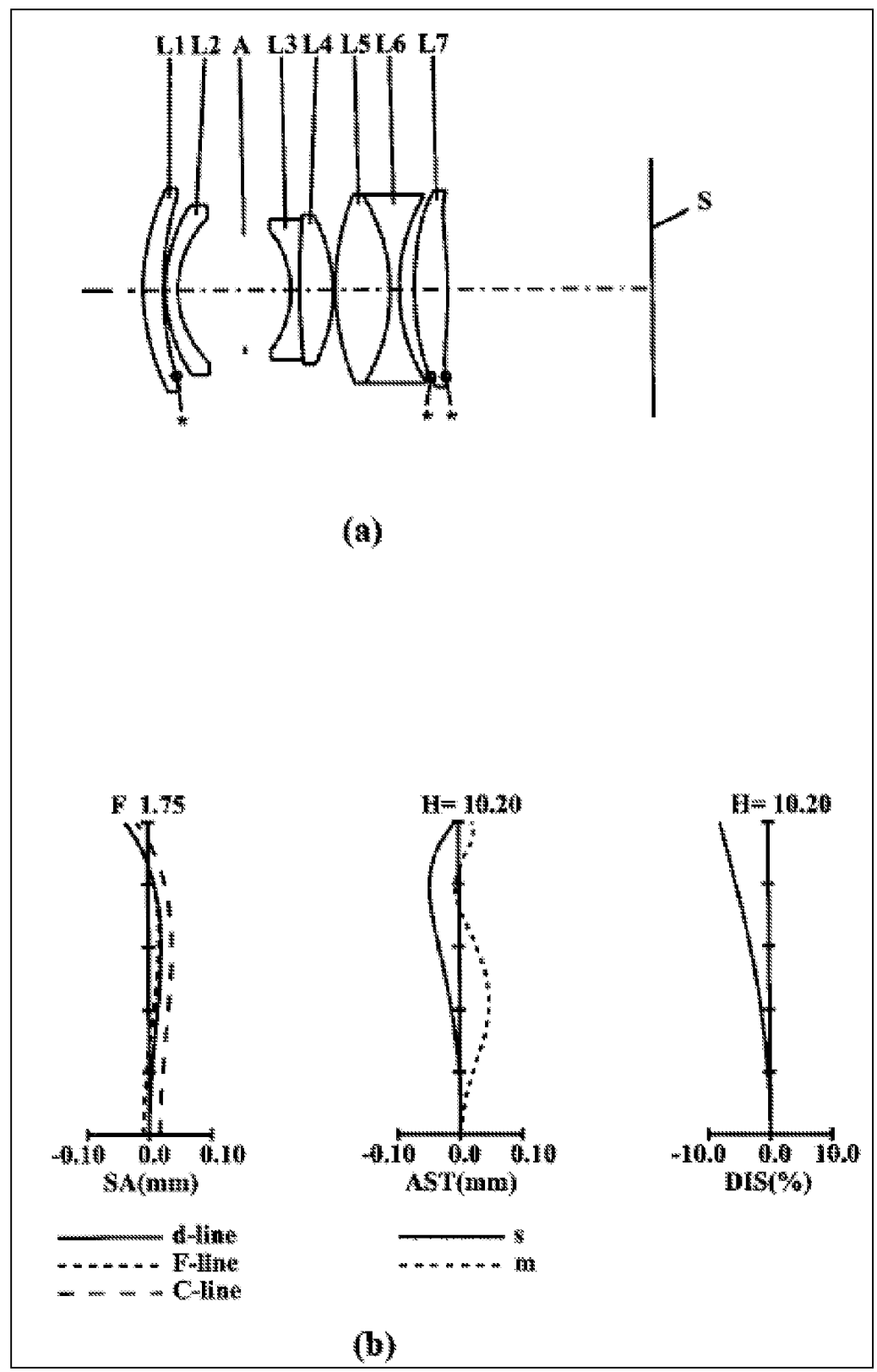
FIG. 3 is a diagram according to Embodiment 3 (Example 3), wherein (a) shows a lens arrangement diagram, and (b) shows longitudinal aberration diagrams.

A lens system shown in FIG. 3 has a front unit including, in order from the object side toward the image side, a positive lens element L1 having an aspheric surface, and a spherical negative lens element L2 having a refractive index of 1.49. A lens element L7 disposed closest to the image side is a both-side aspheric lens element.

Embodiment 4

Figure 4:
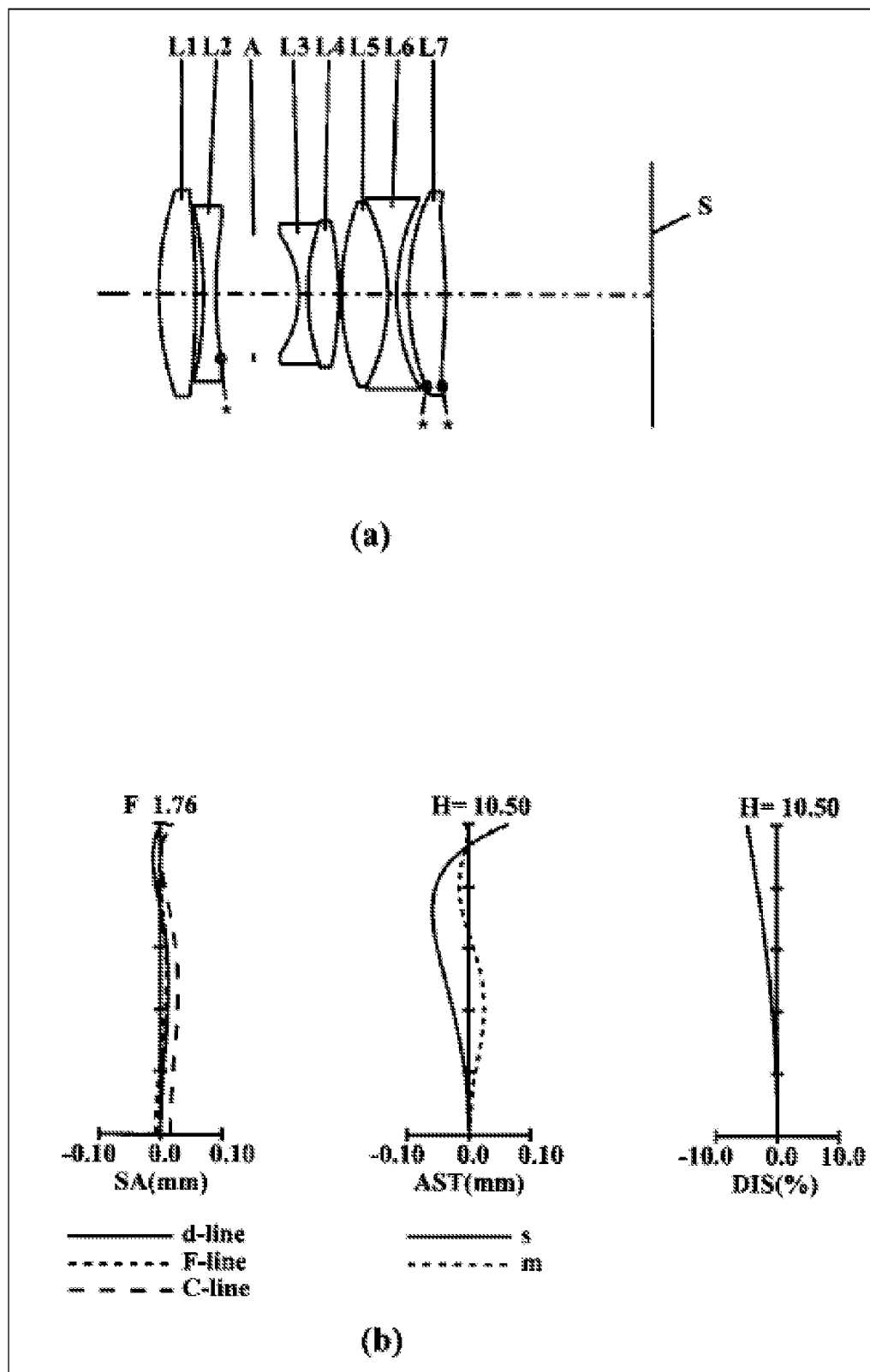
FIG. 4 is a diagram according to Embodiment 4 (Example 4), wherein (a) shows a lens arrangement diagram, and (b) shows longitudinal aberration diagrams.

A lens system shown in FIG. 4 includes, in order from the object side toward the image side, a positive lens element L1 and a negative lens element L2. An air space between the periphery of the positive lens element L1 and the periphery of the negative lens element L2 is narrower than an air space between the center of the positive lens element L1 and the center of the negative lens element L2. The negative lens element L2 has a concave surface on its object side, and the positive lens element L1 and the negative lens element L2 can be fixed in a state where a circumferential portion of the negative lens element L2 facing the object side contacts a surface of the positive lens element L1 facing the image side. A lens element L7 disposed closest to the image side is a both-side aspheric lens element having a high refractive index of 1.88.

Embodiment 5

Figure 5:
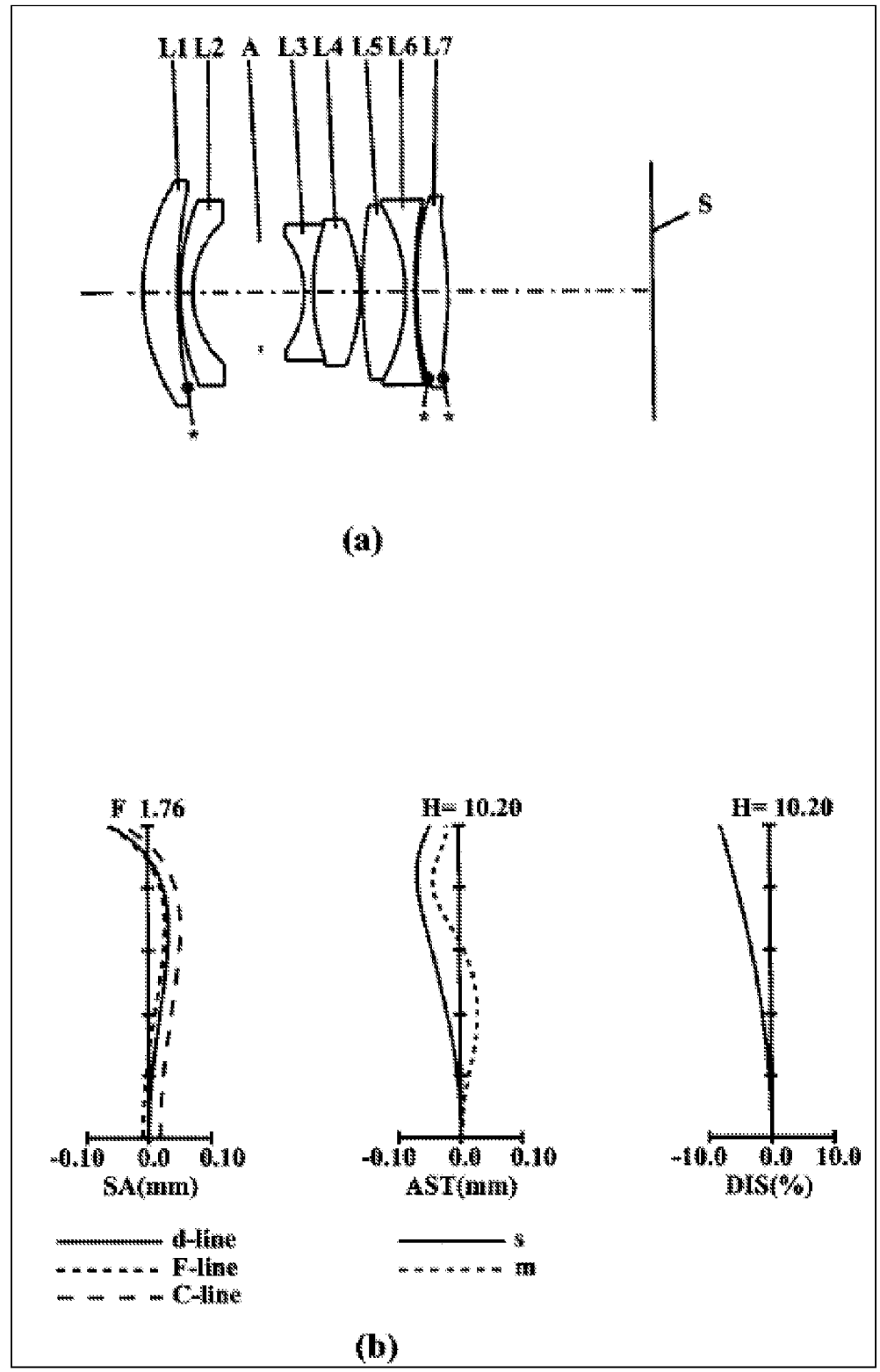
FIG. 5 is a diagram according to Embodiment 5 (Example 5), wherein (a) shows a lens arrangement diagram, and (b) shows longitudinal aberration diagrams.

In a lens system shown in FIG. 5, a positive lens element L1 included in a front unit has a low refractive index of 1.73. Further, an air space between the periphery of a lens element L6 and the periphery of a lens element L7 is wider than an air space between the center of the lens element L6 and the center of the lens element L7

Embodiment 6

Figure 6:
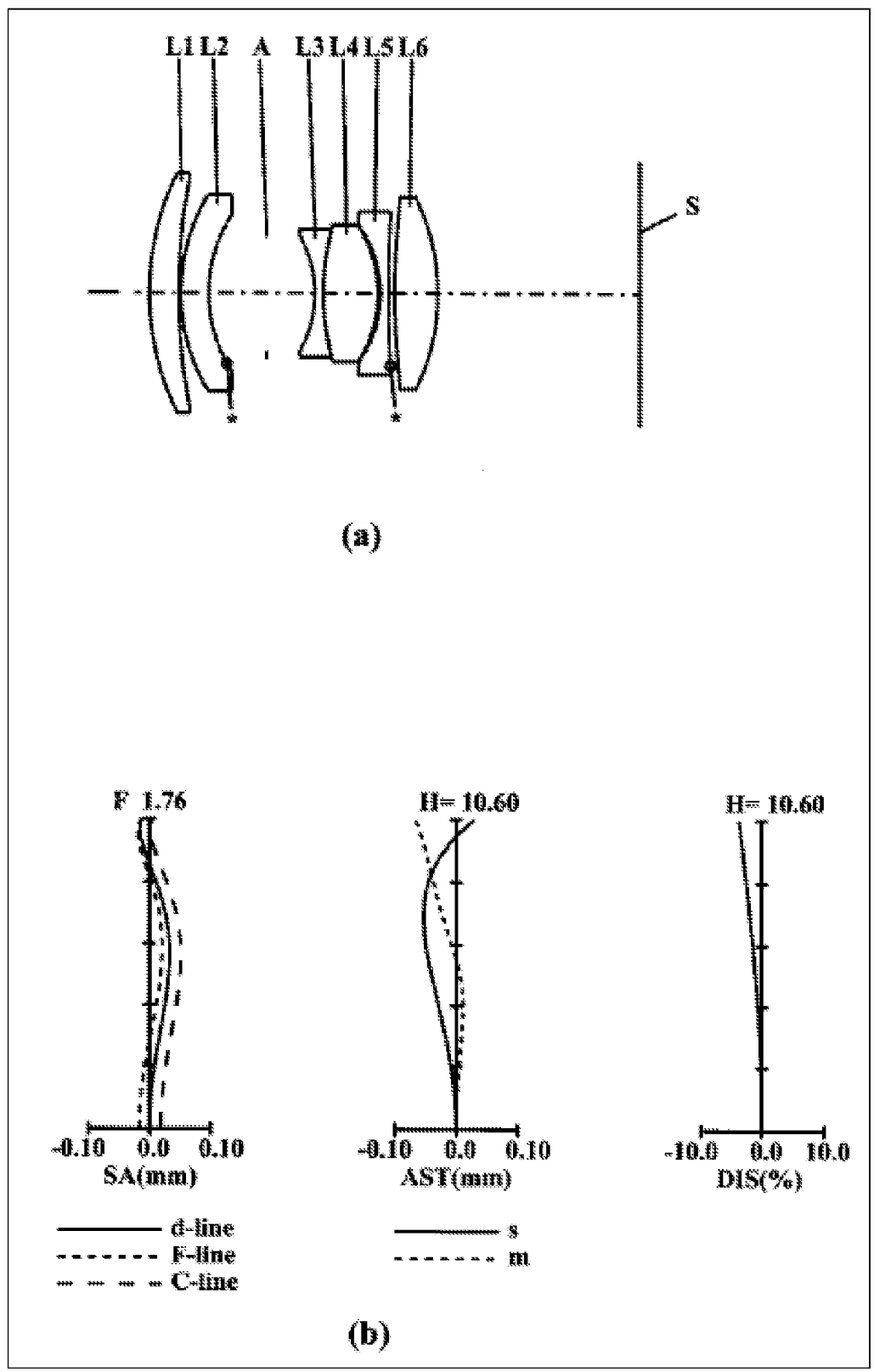
FIG. 6 is a diagram according to Embodiment 6 (Example 6), wherein (a) shows a lens arrangement diagram, and (b) shows longitudinal aberration diagrams.

In a lens system shown in FIG. 6, a positive lens element L1 included in a front unit has a high refractive index of 1.95. A rear unit includes four lens elements (two negative lens elements and two positive lens elements). A lens element L6 closest to the image side is a spherical lens element, and a lens element L5 second closest to the image side is an aspheric lens element.

Embodiment 7

Figure 7:
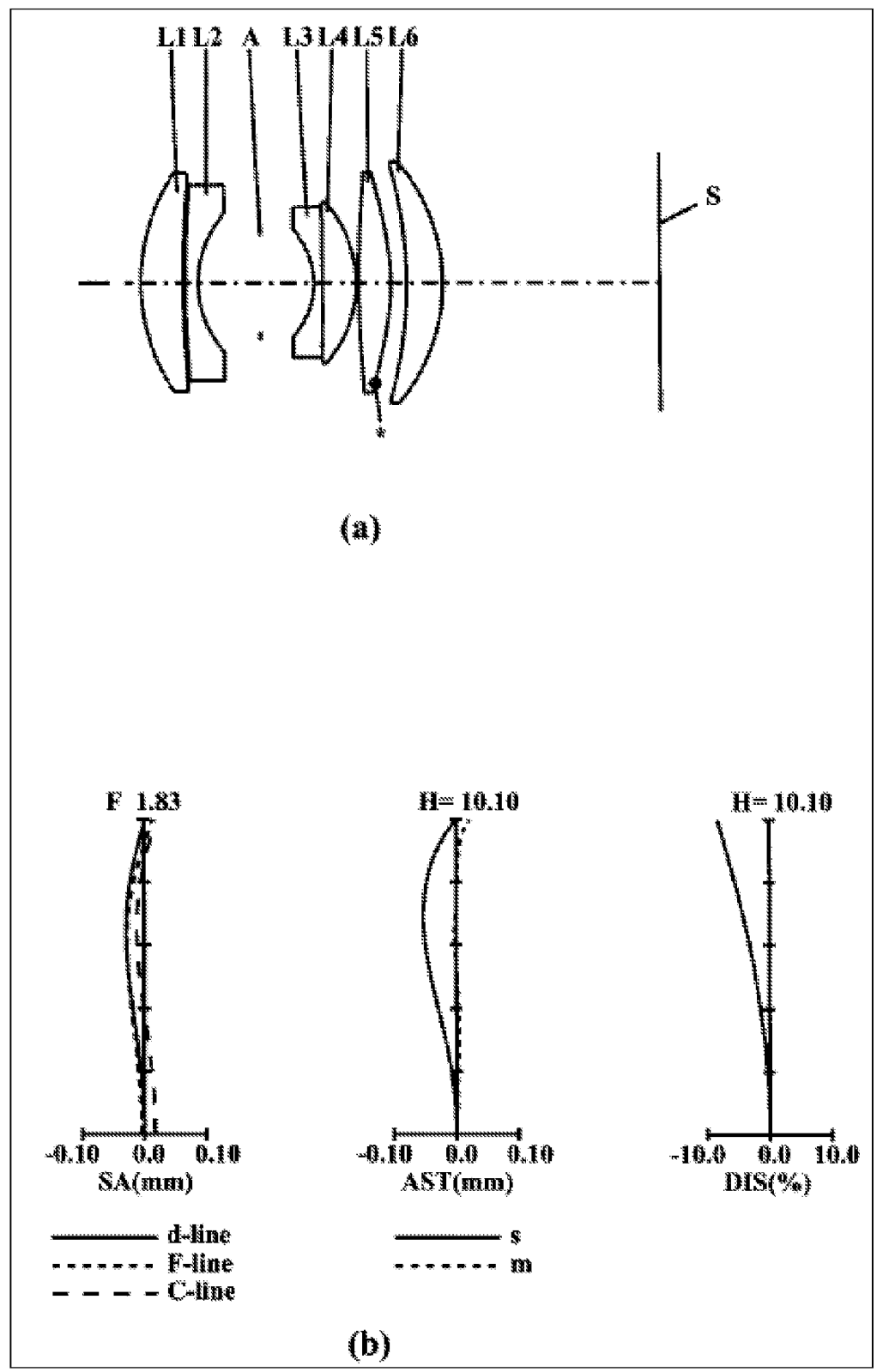
FIG. 7 is a diagram according to Embodiment 7 (Example 7), wherein (a) shows a lens arrangement diagram, and (b) shows longitudinal aberration diagrams.

In a lens system shown in FIG. 7, a front unit is constituted by spherical lens elements. A positive lens element L1 and a negative lens element L2 in the front unit are cemented with each other. A rear unit includes one negative lens element and three positive lens elements. A lens element L7 closest to the image side is a spherical lens element, and a lens element L5 second closest to the image side is an aspheric lens element.

Embodiment 8

Figure 8:
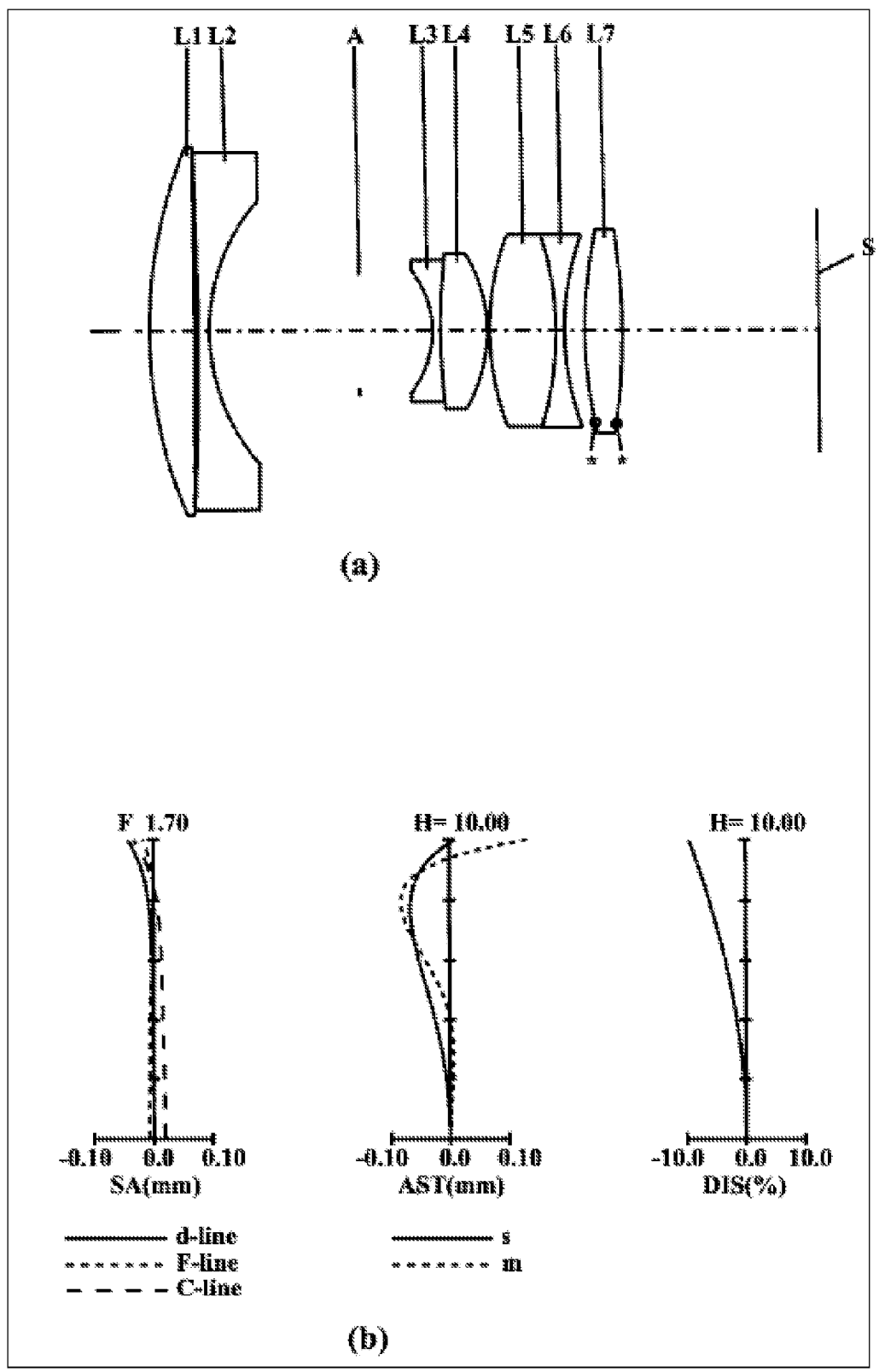
FIG. 8 is a diagram according to Embodiment 8 (Example 8), wherein (a) shows a lens arrangement diagram, and (b) shows longitudinal aberration diagrams.

In a lens system shown in FIG. 8, a front unit is constituted by spherical lens elements. An air space is provided between a positive lens element L1 and a negative lens element L2.

Embodiment 9

Figure 9:
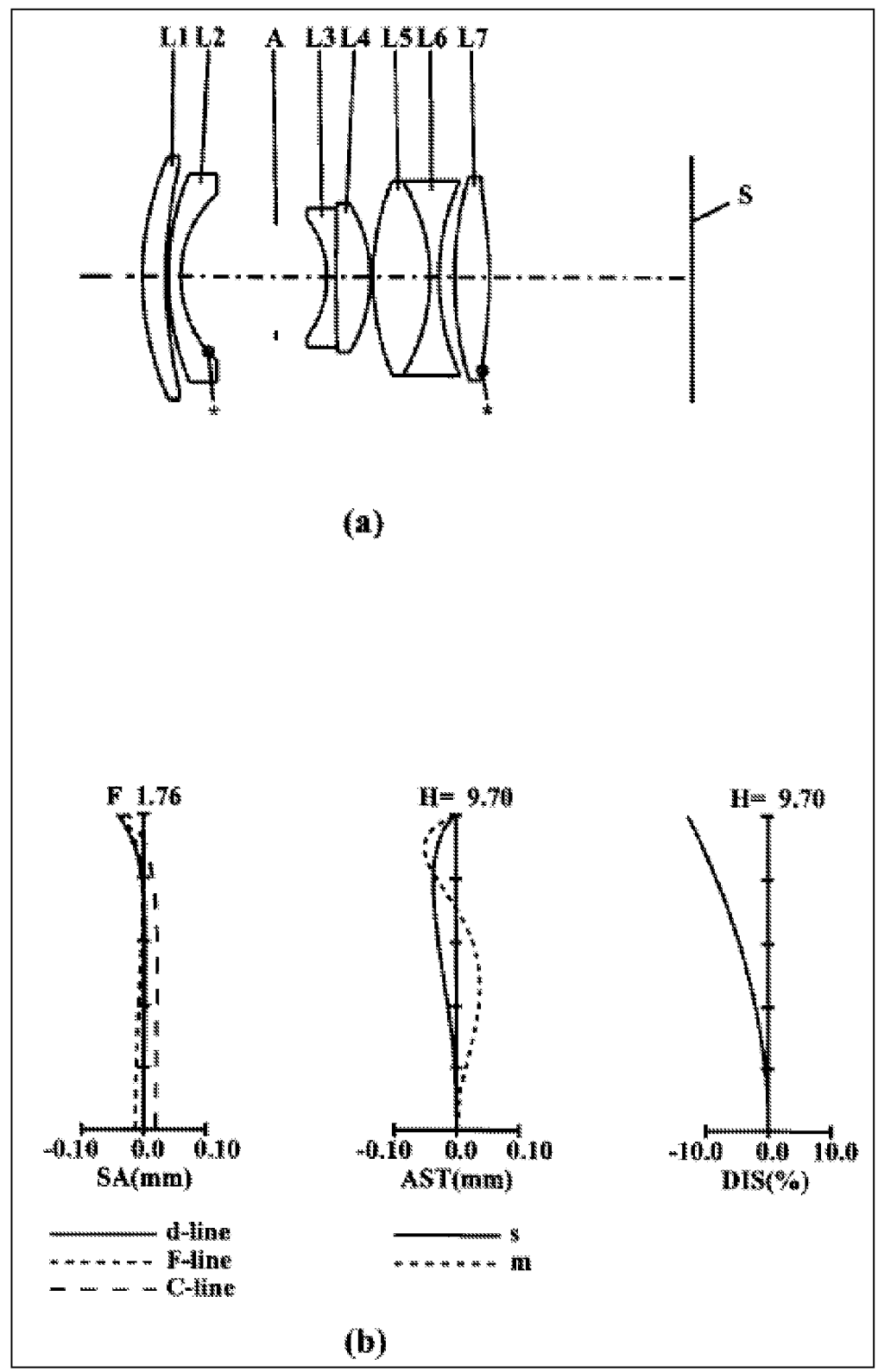
FIG. 9 is a diagram according to Embodiment 9 (Example 9), wherein (a) shows a lens arrangement diagram, and (b) shows longitudinal aberration diagrams.

A lens system shown in FIG. 9 is a fast lens system having an F number of about 1.7, and a half view angle increased to 37.6 degrees. An aspheric surface is provided in a front unit.

Embodiment 10

Figure 10:
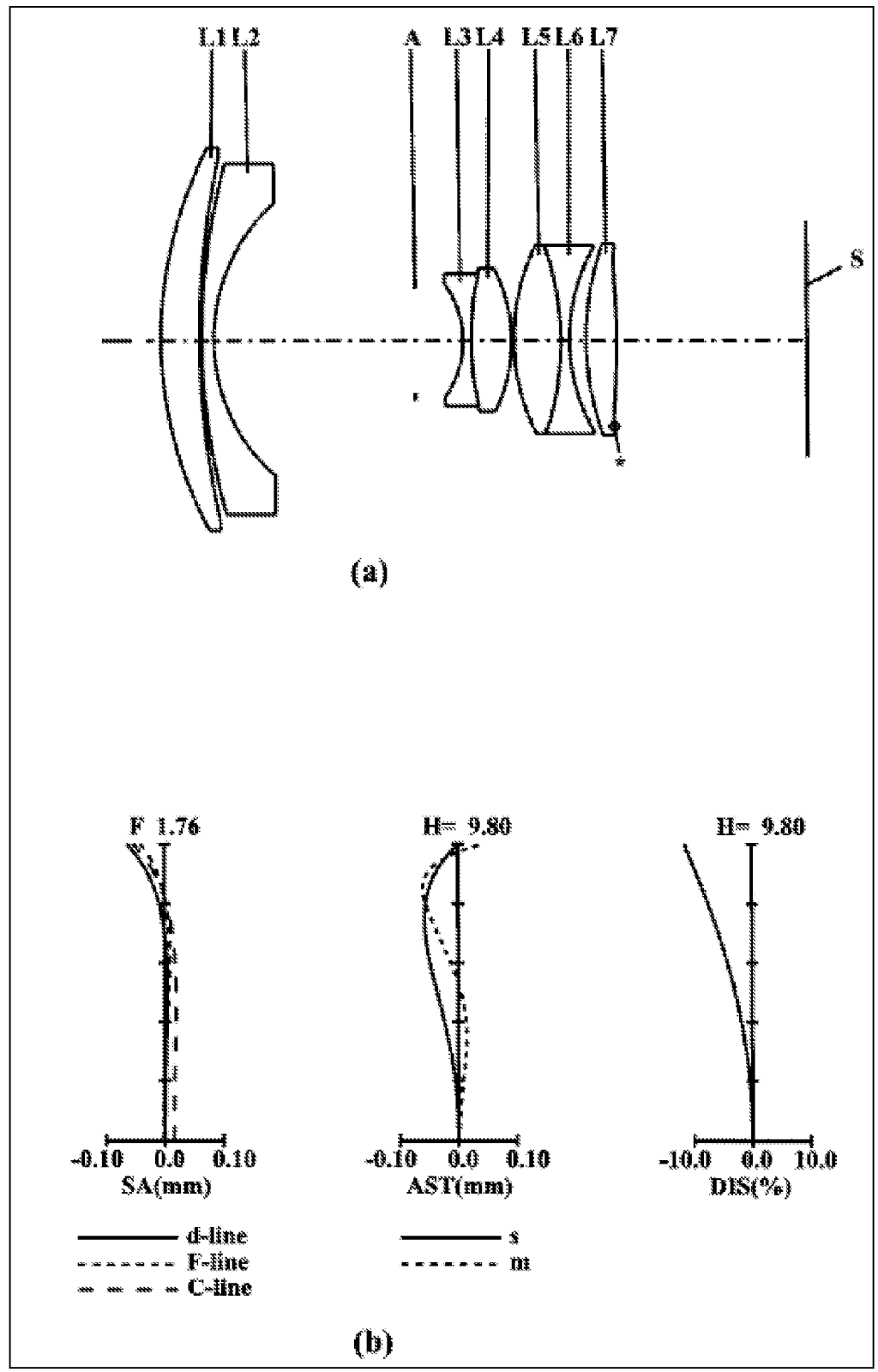
FIG. 10 is a diagram according to Embodiment 10 (Example 10), wherein (a) shows a lens arrangement diagram, and (b) shows longitudinal aberration diagrams.

A lens system shown in FIG. 10 is a fast lens system having an F number of about 1.7, and a half view angle increased to 37.6 degrees. A front unit is constituted by spherical lens elements.

Embodiment 11

Figure 11:
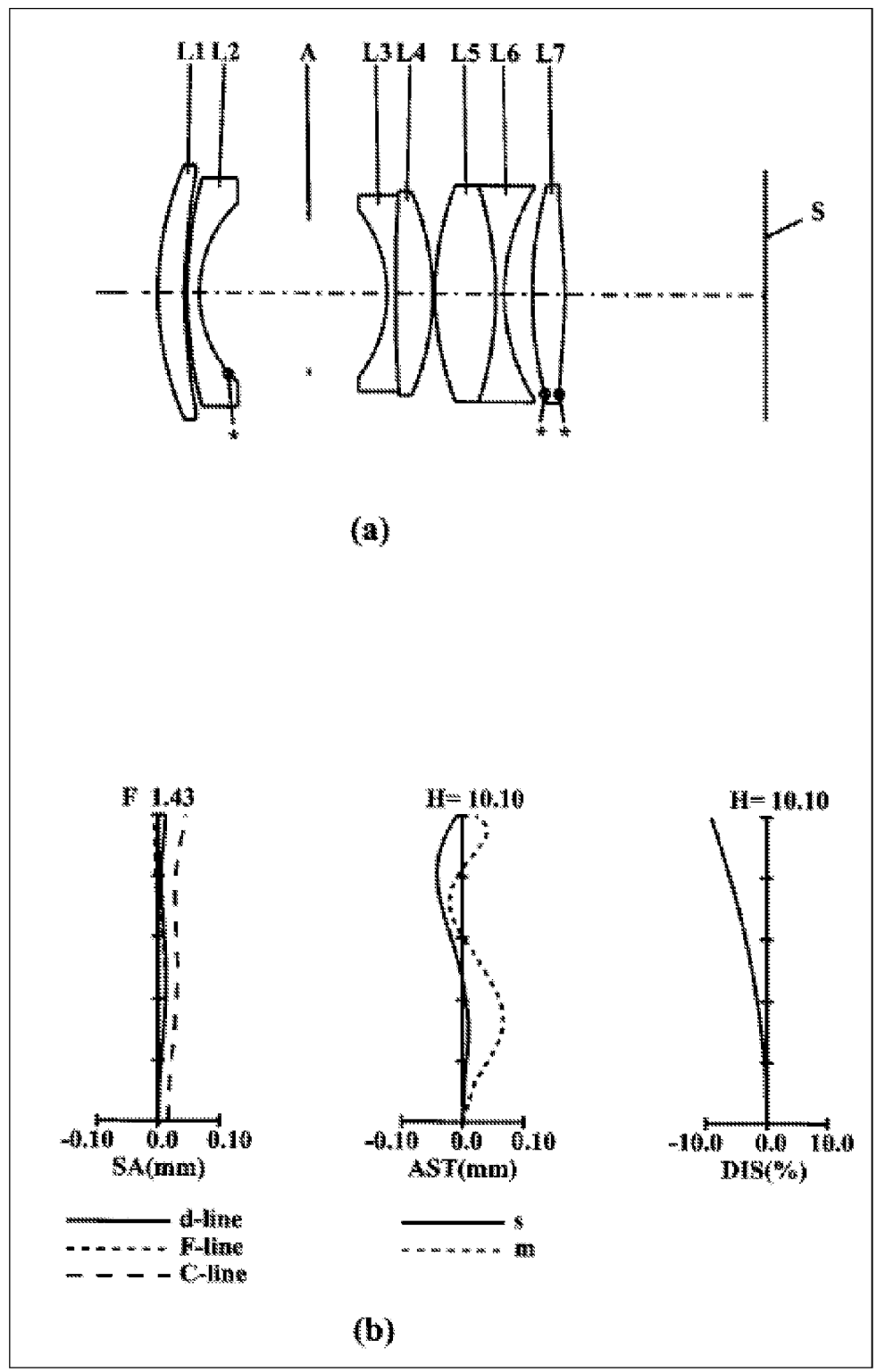
FIG. 11 is a diagram according to Embodiment 11 (Example 11), wherein (a) shows a lens arrangement diagram, and (b) shows longitudinal aberration diagrams.

In a lens system shown in FIG. 11, both surfaces of a lens element L7 closest to the image side are aspheric surfaces. The lens system has an F number of 1.4. A positive lens element having a refractive index exceeding 1.9 is disposed in a rear unit, whereby an astigmatic difference is favorably corrected even when the F number is large.

The lens systems of the respective embodiments of the present invention are fast lens systems having the F numbers ranging from 1.4 to 2.1. The positive lens element disposed closest to the object side suppresses an increase in the light beam diameter of the lens unit disposed on the image side relative to the lens element closest to the object side. That is, the positive lens element suppresses retrofocus characteristics. Accordingly, the diaphragm mechanism provided between the lens surfaces can be reduced in size. Further, since the diaphragm mechanism is disposed in the widest air space in the lens system, an expansion of the space occupied by the diaphragm mechanism can be suppressed. The lens systems of the respective embodiments of the present invention satisfy the following conditional expressions (1) and (2):

$$0.05 < L\_1/L\_TH < 0.21 \quad (1)$$

$$1.5 < L\_TH/Y < 8 \quad (2)$$

where,

L_1 is an interval from a lens surface located closest to the object side to a lens surface located on the object side relative to the diaphragm in the lens system (the length of the front unit that is a lens unit disposed on the object side relative to the diaphragm).

L_TH is an interval from the lens surface located closest to the object side to the lens surface located closest to the image side in the lens system, and Y is a maximum image height.

Conditional expressions (1) and (2) provide the conditions for size reduction of the lens system. Specifically, the condition (1) sets forth the thickness of the front unit. When the value exceeds the upper limit of the condition (1), the thickness of the front unit is increased, and the front lens diameter is also increased, resulting in an increase in the size of the lens system. When the value goes below the lower limit of the condition (1), the thickness of the front unit is excessively decreased, resulting in a difficulty in the lens arrangement. Preferably, the lower limit of the condition (1) is set to 0.09 to facilitate the lens arrangement in the front unit.

The condition (2) sets forth the distance from the lens surface closest to the object side to the lens surface closest to the image side. A lens system in which the value exceeds the upper limit of the condition (2) is not small in size, whereas a lens system in which the value goes below the lower limit of the condition (2) causes a difficulty in arranging lens elements and a diaphragm mechanism. Preferably, the upper limit of the condition (2) is about 5 and the lower limit thereof is about 2, thereby obtaining a small-sized lens system having a favorable aberration.

Further, a glass material having a high refractive index not less than 1.85 is used for the two or more lens elements constituting the lens system to reduce the sizes of the lens elements.

When the front unit is constituted by two lens elements, i.e., a positive lens element and a negative lens element, in order from the object side, an astigmatic difference. Which is hard to correct by using one positive lens element, can be easily corrected. Further, since the light beam diameter can be reduced as compared with the case where a negative lens element is disposed closest to the object side, size reduction of the lens system is facilitated.

Further, when two or more positive lens elements are disposed in the rear unit to disperse the positive power of the rear unit into the respective positive lens elements, the curvature radius of each of the surfaces of the positive lens elements can be increased. Thereby an astigmatic difference, which is likely to occur in a fist lens having a large F number, can be suppressed within a range from the maximum image height to the intermediate image height.

Furthermore, when, in the rear unit, an aspheric surface is provided on the lens element closest to the image side or on the lens element second closest to the image side, a field curvature that occurs in the rear unit can be easily corrected. Preferably, the lens surface closest to the image side is aspheric. More preferably, the both surfaces of the lens element closest to the image side are aspheric, respectively.

Furthermore, effective correction of an astigmatic difference is realized when a lens element having a lens surface of a smallest curvature radius in the rear unit is a negative lens element, a lens element having a second smallest curvature radius is a positive lens element, and the negative lens element and the positive lens element are adjacent to each other. The negative lens element having the surface of the smallest curvature radius and the positive lens element having the surface of the second smallest curvature radius cancel an astigmatic difference. If the distance between these two surfaces is increased, astigmatic difference correction over the entire image surface becomes imbalanced, resulting in a difficulty in flattening the image surface in the entire optical system.

The refractive index NdL1 of the positive lens element disposed closest to the object side satisfies the following condition:

$$1.70 < NdL1 < 2.4 \quad (3)$$

where NdL1 is the refractive index of the positive lens element, disposed closest to the object side.

The condition (3) sets forth the refractive index of the positive lens element disposed closest to the object side. If the value goes below the lower limit of the condition (3), the Petzval sum becomes excessively small. Thus, this situation is unpreferable. When the value of NdL1 is 1.8 or more, flattening of the image surface is facilitated. If the value exceeds the upper limit of the condition (3), the Petzval sum becomes excessively large. Thus, this situation is unpreferable. When the value of NdL1 is 2.1 or less, flattening of the image surface is facilitated.

The refractive indices of the positive lens element and the negative lens element constituting the front unit satisfy the following condition:

$$0.20 < NdL1 - NdL2 < 0.45 \quad (4)$$

where NdL2 is the refractive index of the negative lens element disposed second closest to the object side.

When the value exceeds the upper limit of the condition (4), a field curvature toward the under side occurs due to an air lens provided between the two lens elements in the front unit. When the value goes below the lower limit of the condition (4), a field curvature toward the over side occurs, which is difficult to correct.

Further, in the lens system, a distortion at the maximum image height satisfies the following condition:

$$-16\% < Dist. < 0\% \qquad (5)$$

where Dist is the distortion at the maximum image height.

The condition (5) sets forth the distortion. When the value exceeds the upper limit of the condition (5), the power of the positive lens element in the front unit, in which the height of an off-axis beam is increased, is undesirably increased, and the image surface is apt to fall toward the under side. When the value goes below the lower limit of the condition (5), a strong barrel distortion occurs, which is difficult to correct.

While each of the lens systems of Embodiments 1 to 11 includes two lens elements in the front unit, the front unit may include three lens elements. Further, the diaphragm may be disposed close to the lens surface on the image side in the widest air space, and thus the rear unit can be easily reduced in size.

Some of the lens systems of Embodiments 1 to 11 have no aspheric surface in the front unit while the other lens systems have one aspheric surface in the front unit. However, a lens system having two or more aspheric surfaces in a front unit is also within the scope of the present invention.

Further, a lens system having three or more aspheric surfaces in a rear unit is also within the scope of the present invention.

As shown in Numerical Examples 1 to 4 and 6 to 11 described below, size reduction of a lens system is easily realized when the lens system satisfies both the conditions (1) and (2), or the condition (3), and includes three or more lens elements each having a refractive index equal to or greater than 1.80. Particularly, size reduction is realized more easily if one or more lens elements in the front unit and two or more lens elements in the rear unit have refractive indices equal to or greater than 1.80.

The power of the front unit of the lens system satisfies the following condition:

$$-0.35 < \phi L1/\phi\_L < 0.35 \qquad (6)$$

where, $\phi\_L1$ is the power of the front unit, and $\phi\_L1$ is the power of the rear unit.

When the value goes below the lower limit of the condition (6), the negative power of the front unit is excessively increased, and the entire lens system exhibits significant retrofocus characteristics, resulting in an increase in the air space where the subsequent diaphragm is disposed and/or an increase in the size of the rear unit. When the value exceeds the upper limit of the condition (6), the power of the front unit is increased, and the curvature radius of each of the lens surfaces in the front unit is excessively reduced, resulting in a difficulty in correcting an astigmatic difference.

The lens units constituting the zoom lens system according to any of the embodiments of the present invention may be composed exclusively of refractive type lens elements that deflect the incident light by refraction (that is, lenses of a type in which deflection is achieved at the interface between media each having a distinct refractive index). Alternatively, the lens units may employ any one of or a combination of some of: diffractive type lens elements that deflect the incident light by diffraction; refractive-diffractive hybrid type lens elements that deflect the incident light by a combination of diffraction and refraction; and gradient index type lens elements that deflect the incident light by distribution of refractive index in the medium.

Although not specifically described in the embodiments of the present invention, a parallel plate having no substantial power such as an optical low-pass filter or a face plate of an image sensor, or a microlens array for increasing the aperture efficiency of the image sensor may be provided between the image surface S and the lens system.

Embodiment 12

Figure 12:
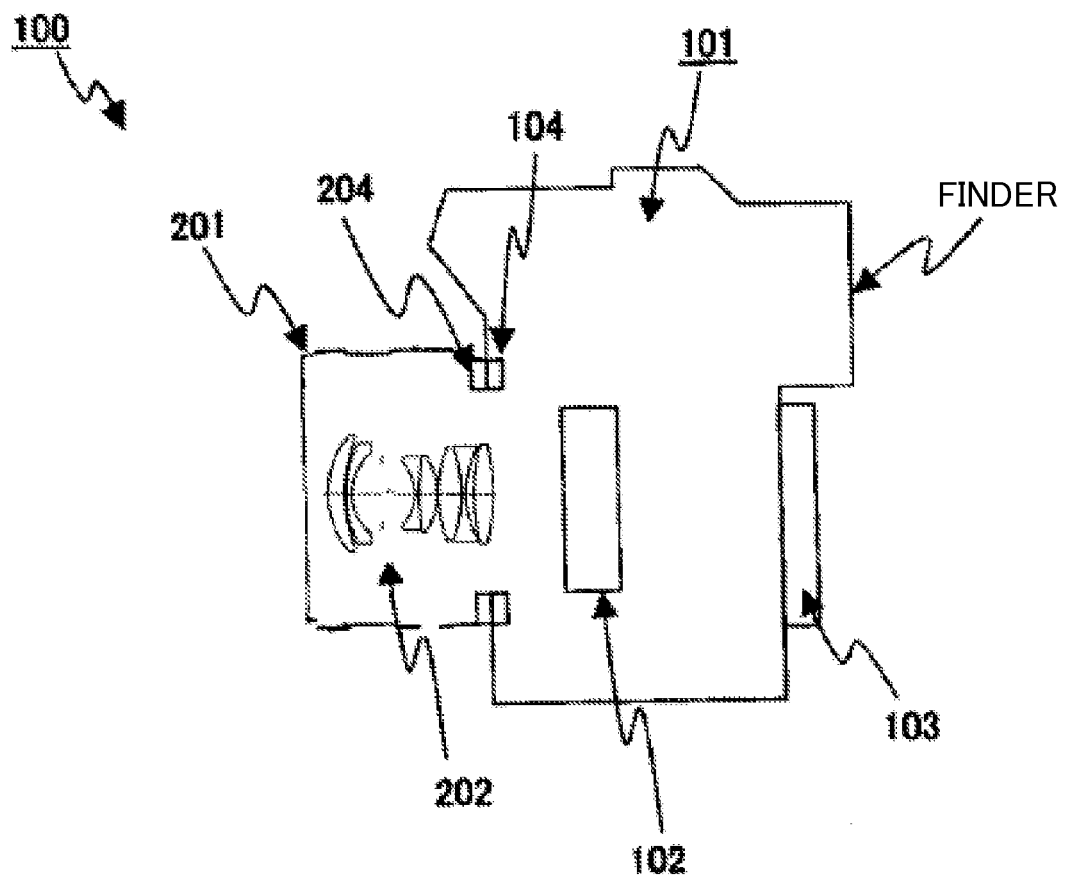
FIG. 12 is a diagram illustrating a schematic configuration of an interchangeable-lens type digital camera system according to Embodiment 12.

FIG. 12 is a schematic construction diagram showing an interchangeable-lens type digital camera system according to Embodiment 12. An interchangeable-lens type digital camera system 100 (hereinafter, simply referred to as "camera system") according to the present embodiment includes a camera body 101, and an interchangeable lens apparatus 201 connected to the camera body 101 in an attachable and removable manner.

The camera body 101 includes an image sensor 102 which receives an optical image formed by a lens system 202 of the interchangeable lens apparatus 201 to convert the optical image into an electric image signal, a liquid crystal display monitor 103 which displays the image signal obtained by the image sensor 102, and a camera mount section 104. On the other hand, the interchangeable lens apparatus 201 includes the lens system 202 according to any of Embodiments 1 to 11, a lens barrel which holds the lens system 202, and a lens mount section 204 connected to the camera mount section 104 of the camera body. The camera mount section 104 and the lens mount section 204 are physically coupled to each other. Further, the camera mount section 104 and the lens mount section 204 function as interfaces for electrically connecting a controller (not shown) inside the camera body 101 and a controller (not shown) inside the interchangeable lens apparatus 201 to achieve mutual signal communication.

The camera system 100 of the present embodiment includes the lens system 202 according to any of Embodiments 1 to 11, and hence is capable of obtaining a preferable optical image.

EXAMPLES

Hereinafter, numerical examples will be described, in which the lens systems according to Embodiments 1 to 11 are implemented specifically. Numerical Examples 1 to 11 corresponds to Embodiments 1 to 11, respectively. In each numerical example, the units of the length in the table are all "mm", and the units of the view angle are all "°". Further, r is the radius of curvature, d is the axial distance, nd is the refractive index to the d-line, and vd is the Abbe number to the d-line. Moreover, the surfaces marked with "*" are aspheric surfaces, and the aspheric surface configuration is defined by the following formula:

$$Z = \frac{h^2/r}{1+\sqrt{1-(1+\kappa)(h/r)^2}} + \sum A_n h^n$$

Here, the symbols in the formula indicate the following quantities:

Z is the distance from an on-the-aspheric-surface point at a height h relative to the optical axis to a tangential plane at the top of the aspheric surface;

h is the height relative to the optical axis;

r is the radius of curvature at the top;

κ is the conic constant; and

An is the n-th order aspheric coefficient.

The longitudinal aberration diagrams shown in each of FIGS. 1(b) to 11(b) show, in order from the left-hand side, the spherical aberration (SA(mm)), the astigmatism (AST (mm)), and the distortion (DIS (%)). In each spherical aberration diagram, the horizontal axis indicates the defocus amount, the vertical axis indicates the F-number (in each diagram, indicated as and the solid line, the short dash line, and the long dash line indicate the characteristics to the d-line, the F-line, and the C-line, respectively. In each astigmatism diagram, the horizontal axis indicates the defocus amount, the vertical axis indicates the image height (in each diagram, indicated as "H"), and the solid line and the dash line indicate the characteristics to the sagittal image plane (in each diagram, indicated as "s") and the meridional image plane (in each diagram, indicated as "m"), respectively. In each distortion diagram, the horizontal axis indicates the distortion, and the vertical axis indicates the image height (in each diagram, indicated as "H").

Numerical data of Numerical Examples 1 to 11 are shown in Tables 1 to 11, respectively. Each table includes surface data, aspheric surface data, and various data.

(Numerical Example 1)

TABLE 1

Surface data

| Surface number | r | d | nd | vd |
|---|---|---|---|---|
| Object surface | ∞ | | | |
| 1 | 24.61620 | 2.83620 | 1.89292 | 35.6 |
| 2 | 49.69520 | 0.20000 | | |
| 3 | 31.01750 | 1.00000 | 1.51788 | 70.1 |
| 4* | 11.98740 | 11.18170 | | |
| 5(Diaphragm) | ∞ | 4.07000 | | |
| 6 | −9.39740 | 0.70000 | 1.74250 | 27.2 |
| 7 | 26.34660 | 0.01000 | 1.56732 | 42.8 |
| 8 | 26.34660 | 3.99780 | 1.88300 | 40.8 |
| 9 | −14.56140 | 0.20000 | | |
| 10 | 18.44590 | 5.16480 | 1.88300 | 40.8 |
| 11 | −23.96990 | 0.01000 | 1.56732 | 42.8 |
| 12 | −23.96990 | 0.70000 | 1.64642 | 33.0 |
| 13 | 15.69950 | 1.19040 | | |
| 14 | 25.19460 | 2.51300 | 1.68863 | 52.9 |
| 15* | −63.49530 | BF | | |
| Image surface | ∞ | | | |

Aspherical data

| Surface No. | Parameters |
|---|---|
| 4 | K = 0.00000E+00, A4 = 7.34318E−06, A6 = 5.87040E−08, A8 = 0.00000E+00 |
| 15 | K = −1.00000E+00, A4 = 8.97198E−05, A6 = 1.94080E−08, A8 = 4.82039E−09 |

Various data

| Focal length | 17.4874 |
|---|---|
| F-number | 1.75427 |
| View angle | 32.3373 |
| Image height | 10.3000 |
| Overall length of lens system | 49.9962 |
| BF | 16.22225 |

(Numerical Example 2)

TABLE 2

Surface data

| Surface number | r | d | nd | vd |
|---|---|---|---|---|
| Object surface | ∞ | | | |
| 1* | 26.40870 | 2.98450 | 1.89400 | 35.1 |
| 2 | 68.84630 | 0.20000 | | |
| 3 | 39.28910 | 1.00000 | 1.51788 | 70.1 |
| 4 | 11.65210 | 11.18200 | | |
| 5(Diaphragm) | ∞ | 4.07000 | | |
| 6 | −9.38390 | 0.70000 | 1.75018 | 26.9 |
| 7 | 27.94700 | 0.01000 | 1.56732 | 42.8 |
| 8 | 27.94700 | 3.50550 | 1.88300 | 40.8 |
| 9 | −14.13990 | 0.20000 | | |
| 10 | 18.83350 | 5.49620 | 1.88300 | 40.8 |
| 11 | −22.79060 | 0.01000 | 1.56732 | 42.8 |
| 12 | −22.79060 | 0.70000 | 1.63911 | 33.6 |
| 13 | 15.91690 | 1.13030 | | |
| 14 | 24.76660 | 2.58600 | 1.68863 | 52.9 |
| 15* | −56.99360 | BF | | |
| Image surface | ∞ | | | |

Aspherical data

| Surface No. | Parameters |
|---|---|
| 1 | K = 0.00000E+00, A4 = −4.57047E−06, A6 = 1.32032E−09, A8 = 0.00000E+00 |
| 15 | K = −1.00000E+00, A4 = 9.04831E−05, A6 = 3.96224E−08, A8 = 4.67740E−09 |

Various data

| Focal length | 16.9873 |
|---|---|
| F-number | 1.76534 |
| View angle | 32.9941 |
| Image height | 10.2000 |
| Overall length of lens system | 49.9955 |
| BF | 16.22100 |

(Numerical Example 3)

TABLE 3

Surface data

| Surface number | r | d | nd | vd |
|---|---|---|---|---|
| Object surface | ∞ | | | |
| 1 | 18.33950 | 1.61230 | 1.84666 | 23.8 |
| 2* | 24.12010 | 0.20000 | | |
| 3 | 12.54790 | 1.00000 | 1.48749 | 70.4 |
| 4 | 8.25590 | 5.35210 | | |
| 5(Diaphragm) | ∞ | 3.68960 | | |
| 6 | −8.06550 | 0.70000 | 1.73931 | 27.4 |
| 7 | 61.97230 | 0.01000 | 1.56732 | 42.8 |
| 8 | 61.97230 | 2.66950 | 1.88300 | 40.8 |
| 9 | −13.06140 | 0.20000 | | |
| 10 | 19.96690 | 4.44040 | 1.88300 | 40.8 |
| 11 | −14.43760 | 0.01000 | 1.56732 | 42.8 |
| 12 | −14.43760 | 0.70000 | 1.66436 | 31.6 |
| 13 | 14.78390 | 1.23620 | | |
| 14* | 26.47990 | 2.68070 | 1.81195 | 45.6 |
| 15* | −35.90830 | BF | | |
| Image surface | ∞ | | | |

Aspherical data

| Surface No. | Parameters |
|---|---|
| 2 | K = 0.00000E+00, A4 = −5.46482E−06, A6 = −1.05369E−07, A8 = 1.74342E−10 |
| 14 | K = 0.00000E+00, A4 = 5.33899E−05, A6 = 4.21138E−07, A8 = 8.84863E−09 |
| 15 | K = −1.03675E+00, A4 = 1.18333E−04, A6 = 2.68454E−07, A8 = 1.96446E−08 |

Various data

| Focal length | 17.0000 |
|---|---|
| F-number | 1.75434 |
| View angle | 33.0735 |
| Image height | 10.2000 |

TABLE 3-continued

| | |
|---|---|
| Overall length of lens system | 40.9999 |
| BF | 16.49910 |

(Numerical Example 4)

TABLE 4

Surface data

| Surface number | r | d | nd | vd |
|---|---|---|---|---|
| Object surface | ∞ | | | |
| 1 | 25.90510 | 3.02210 | 1.89635 | 34.1 |
| 2 | −67.53030 | 0.62230 | | |
| 3 | −31.75050 | 1.00000 | 1.57678 | 41.1 |
| 4* | 28.62600 | 3.09450 | | |
| 5(Diaphragm) | ∞ | 3.64910 | | |
| 6 | −8.31750 | 0.70000 | 1.75447 | 26.7 |
| 7 | 17.54630 | 0.01000 | 1.56732 | 42.8 |
| 8 | 17.54630 | 2.47620 | 1.88300 | 40.8 |
| 9 | −28.62110 | 0.20000 | | |
| 10 | 20.64260 | 3.79470 | 1.88300 | 40.8 |
| 11 | −16.59530 | 0.01000 | 1.56732 | 42.8 |
| 12 | −16.59530 | 0.70000 | 1.62169 | 35.3 |
| 13 | 16.62870 | 0.96460 | | |
| 14* | 21.47920 | 2.99900 | 1.88300 | 40.8 |
| 15* | −36.41170 | BF | | |
| Image surface | ∞ | | | |

Aspherical data

| Surface No. | Parameters |
|---|---|
| 4 | K = 0.00000E+00, A4 = −8.40576E−05, A6 = −1.19409E−06, A8 = 0.00000E+00 |
| 14 | K = 0.00000E+00, A4 = 5.76001E−06, A6 = 2.37507E−07, A8 = 3.28130E−09 |
| 15 | K = −1.00000E+00, A4 = 1.10937E−04, A6 = 3.09430E−07, A8 = 6.96800E−09 |

Various data

| | |
|---|---|
| Focal length | 19.9991 |
| F-number | 1.75993 |
| View angle | 28.8697 |
| Image height | 10.5000 |
| Overall length of lens system | 40.0067 |
| BF | 16.76425 |

(Numerical Example 5)

TABLE 5

Surface data

| Surface number | r | d | nd | vd |
|---|---|---|---|---|
| Object surface | ∞ | | | |
| 1 | 16.64440 | 2.77040 | 1.72916 | 54.7 |
| 2* | 40.88740 | 0.20000 | | |
| 3 | 19.54880 | 1.00000 | 1.48749 | 70.4 |
| 4 | 7.99180 | 5.45480 | | |
| 5(Diaphragm) | ∞ | 3.53590 | | |
| 6 | −7.70300 | 0.70000 | 1.61841 | 35.6 |
| 7 | 16.96980 | 0.01000 | 1.56732 | 42.8 |
| 8 | 16.96980 | 3.75830 | 1.88300 | 40.8 |
| 9 | −14.89970 | 0.20000 | | |
| 10 | 41.58130 | 3.46160 | 1.88300 | 40.8 |
| 11 | −14.01750 | 0.01000 | 1.56732 | 42.8 |
| 12 | −14.01750 | 0.70000 | 1.78186 | 25.7 |
| 13 | 37.44260 | 0.20000 | | |
| 14* | 41.69860 | 2.50000 | 1.79656 | 46.9 |
| 15* | −26.14760 | BF | | |
| Image surface | ∞ | | | |

TABLE 5-continued

Aspherical data

| Surface No. | Parameters |
|---|---|
| 2 | K = 0.00000E+00, A4 = 9.48672E−06, A6 = −1.25461E−07, A8 = 5.54880E−10 |
| 14 | K = 0.00000E+00, A4 = 5.69581E−05, A6 = 4.22989E−07, A8 = 1.28103E−08 |
| 15 | K = −1.64452E+00, A4 = 1.26186E−04, A6 = 4.12313E−07, A8 = 2.08508E−08 |

Various data

| | |
|---|---|
| Focal length | 16.7073 |
| F-number | 1.75971 |
| View angle | 33.5429 |
| Image height | 10.2000 |
| Overall length of lens system | 40.9970 |
| BF | 16.49601 |

(Numerical Example 6)

TABLE 6

Surface data

| Surface number | r | d | nd | vd |
|---|---|---|---|---|
| Object surface | ∞ | | | |
| 1 | 21.94370 | 2.37910 | 1.95000 | 45.0 |
| 2 | 47.72830 | 0.20000 | | |
| 3 | 15.41910 | 2.24920 | 1.68893 | 31.1 |
| 4* | 11.33210 | 4.73570 | | |
| 5(Diaphragm) | ∞ | 3.90880 | | |
| 6 | −9.22150 | 0.70000 | 1.60000 | 30.0 |
| 7 | 20.38040 | 0.01000 | 1.56732 | 42.8 |
| 8 | 20.38040 | 4.44050 | 1.85808 | 47.3 |
| 9 | −10.01290 | 0.20000 | | |
| 10 | −9.34050 | 0.70000 | 1.62004 | 36.3 |
| 11* | −1662.68660 | 0.46030 | | |
| 12 | 63.75380 | 3.51740 | 1.95000 | 45.0 |
| 13 | −17.45770 | BF | | |
| Image surface | ∞ | | | |

Aspherical data

| Surface No. | Parameters |
|---|---|
| 4 | K = 0.00000E+00, A4 = 7.83179E−07, A6 = −4.38960E−07, A8 = 0.00000E+00 |
| 11 | K = 0.00000E+00, A4 = 1.07095E−04, A6 = −6.69901E−08, A8 = −2.26973E−09 |

Various data

| | |
|---|---|
| Focal length | 20.9999 |
| F-number | 1.75868 |
| View angle | 27.6727 |
| Image height | 10.6000 |
| Overall length of lens system | 40.0031 |
| BF | 16.50214 |

(Numerical Example 7)

TABLE 7

Surface data

| Surface number | r | d | nd | vd |
|---|---|---|---|---|
| Object surface | ∞ | | | |
| 1 | 15.66450 | 3.41190 | 1.88300 | 40.8 |
| 2 | 95.59600 | 0.20000 | 1.56732 | 42.8 |

TABLE 7-continued

| | | | | |
|---|---|---|---|---|
| 3 | 95.59600 | 1.00000 | 1.51226 | 57.6 |
| 4 | 8.42640 | 4.99870 | | |
| 5(Diaphragm) | ∞ | 4.22570 | | |
| 6 | −6.52430 | 0.70000 | 1.84065 | 23.9 |
| 7 | −368.55240 | 0.01000 | 1.56732 | 42.8 |
| 8 | −368.55240 | 2.68300 | 1.88300 | 40.8 |
| 9 | −9.83880 | 0.20000 | | |
| 10 | ∞ | 0.01000 | | |
| 11 | 96.05340 | 2.54600 | 1.72916 | 54.7 |
| 12* | −20.56080 | 1.28630 | | |
| 13 | −34.18860 | 2.88580 | 1.72916 | 54.7 |
| 14 | −14.97950 | BF | | |
| Image surface | ∞ | | | |

Aspherical data

| Surface No. | Parameters |
|---|---|
| 12 | K = 0.00000E+00, A4 = 6.98520E−05, A6 = 1.77801E−07, A8 = −5.03014E−10 |

Various data

| | |
|---|---|
| Focal length | 17.2940 |
| F-number | 1.83161 |
| View angle | 32.5142 |
| Image height | 10.1000 |
| Overall length of lens system | 41.5122 |
| BF | 17.35485 |

(Numerical Example 8)

TABLE 8

Surface data

| Surface number | r | d | nd | vd |
|---|---|---|---|---|
| Object surface | ∞ | | | |
| 1 | 39.62840 | 3.81320 | 1.89196 | 36.0 |
| 2 | −1570.55980 | 0.29380 | | |
| 3 | −349.34410 | 1.00000 | 1.48749 | 70.4 |
| 4 | 16.79960 | 12.61850 | | |
| 5(Diaphragm) | ∞ | 6.15460 | | |
| 6 | −8.19860 | 0.70000 | 1.76201 | 26.4 |
| 7 | 52.34840 | 0.01000 | 1.56732 | 42.8 |
| 8 | 52.34840 | 3.96030 | 1.88300 | 40.8 |
| 9 | −12.53970 | 0.20000 | | |
| 10 | 22.39680 | 5.63460 | 1.88300 | 40.8 |
| 11 | −25.79740 | 0.01000 | 1.56732 | 42.8 |
| 12 | −25.79740 | 0.70000 | 1.65766 | 32.1 |
| 13 | 23.32640 | 1.72090 | | |
| 14* | 32.69430 | 3.18420 | 1.72916 | 54.7 |
| 15* | −43.55490 | BF | | |
| Image surface | ∞ | | | |

Aspherical data

| Surface No. | Parameters |
|---|---|
| 14 | K = 0.00000E+00, A4 = −2.09332E−05, A6 = −2.18855E−07, A8 = 9.61996E−10 |
| 15 | K = −1.00000E+00, A4 = 4.01307E−05, A6 = −2.61765E−07, A8 = 2.20310E−09 |

Various data

| | |
|---|---|
| Focal length | 16.1935 |
| F-number | 1.69591 |
| View angle | 34.3196 |
| Image height | 10.0000 |
| Overall length of lens system | 56.5096 |
| BF | 16.50953 |

(Numerical Example 9)

TABLE 9

Surface data

| Surface number | r | d | nd | vd |
|---|---|---|---|---|
| Object surface | ∞ | | | |
| 1 | 23.74310 | 1.86710 | 1.84666 | 23.8 |
| 2 | 38.09010 | 0.20000 | | |
| 3 | 21.22650 | 1.00000 | 1.51788 | 70.1 |
| 4* | 9.18330 | 7.62850 | | |
| 5(Diaphragm) | ∞ | 4.07000 | | |
| 6 | −7.79570 | 0.70000 | 1.72969 | 27.8 |
| 7 | 194.37380 | 0.01000 | 1.56732 | 42.8 |
| 8 | 194.37380 | 2.74180 | 1.88300 | 40.8 |
| 9 | −11.57520 | 0.20000 | | |
| 10 | 20.38860 | 4.55010 | 1.88300 | 40.8 |
| 11 | −14.83610 | 0.01000 | 1.56732 | 42.8 |
| 12 | −14.83610 | 0.70000 | 1.68612 | 30.1 |
| 13 | 18.73850 | 1.24260 | | |
| 14 | 28.12240 | 2.85510 | 1.68863 | 52.9 |
| 15* | −29.02610 | BF | | |
| Image surface | ∞ | | | |

Aspherical data

| Surface No. | Parameters |
|---|---|
| 4 | K = 0.00000E+00, A4 = 1.32817E−05, A6 = 1.06455E−07, A8 = 2.51890E−09 |
| 15 | K = −1.00000E+00, A4 = 9.17495E−05, A6 = 3.98302E−09, A8 = 4.41564E−09 |

Various data

| | |
|---|---|
| Focal length | 14.4199 |
| F-number | 1.75937 |
| View angle | 37.6445 |
| Image height | 9.7000 |
| Overall length of lens system | 43.9949 |
| BF | 16.21975 |

(Numerical Example 10)

TABLE 10

Surface data

| Surface number | r | d | nd | vd |
|---|---|---|---|---|
| Object surface | ∞ | | | |
| 1 | 34.57820 | 3.28870 | 1.87384 | 27.0 |
| 2 | 71.89870 | 0.20000 | | |
| 3 | 55.92740 | 1.00000 | 1.51788 | 70.1 |
| 4 | 15.47950 | 17.14610 | | |
| 5(Diaphragm) | ∞ | 4.07000 | | |
| 6 | −8.17080 | 0.70000 | 1.74472 | 27.1 |
| 7 | 24.94350 | 0.01000 | 1.56732 | 42.8 |
| 8 | 24.94350 | 3.44660 | 1.88300 | 40.8 |
| 9 | −13.33380 | 0.20000 | | |
| 10 | 17.94210 | 3.97720 | 1.88300 | 40.8 |
| 11 | −23.80310 | 0.01000 | 1.56732 | 42.8 |
| 12 | −23.80310 | 0.70000 | 1.63190 | 34.2 |
| 13 | 15.62420 | 1.40780 | | |
| 14 | 23.39480 | 2.61890 | 1.68863 | 52.9 |
| 15* | −43.81450 | BF | | |
| Image surface | ∞ | | | |

Aspherical data

| Surface No. | Parameters |
|---|---|
| 15 | K = −1.00000E+00, A4 = 1.10570E−04, A6 = −6.27408E−08, A8 = 5.37876E−09 |

TABLE 10-continued

Various data

| | |
|---|---|
| Focal length | 14.4199 |
| F-number | 1.75902 |
| View angle | 37.5518 |
| Image height | 9.8000 |
| Overall length of lens system | 55.0013 |
| BF | 16.22601 |

(Numerical Example 11)

TABLE 11

Surface data

| Surface number | r | d | nd | vd |
|---|---|---|---|---|
| Object surface | ∞ | | | |
| 1 | 26.37580 | 2.20370 | 1.88300 | 40.8 |
| 2 | 52.25560 | 0.20000 | | |
| 3 | 36.86130 | 1.00000 | 1.49710 | 81.6 |
| 4* | 10.48480 | 9.03040 | | |
| 5(Diaphragm) | ∞ | 6.43500 | | |
| 6 | −11.34950 | 0.70000 | 1.49461 | 28.1 |
| 7 | 149.09430 | 0.01000 | 1.56732 | 42.8 |
| 8 | 149.09430 | 3.02020 | 1.93953 | 45.2 |
| 9 | −20.95220 | 0.20000 | | |
| 10 | 24.53320 | 4.98590 | 1.87406 | 46.8 |
| 11 | −28.93020 | 0.01000 | 1.56732 | 42.8 |
| 12 | −28.93020 | 0.70000 | 1.45242 | 27.2 |
| 13 | 16.56430 | 2.31260 | | |
| 14* | 35.28170 | 2.69200 | 1.58065 | 63.0 |
| 15* | −38.95790 | BF | | |
| Image surface | ∞ | | | |

Aspherical data

| Surface No. | Parameters |
|---|---|
| 4 | K = 0.00000E+00, A4 = 2.71431E−05, A6 = −5.53610E−07, A8 = 2.21037E−08, A10 = −2.31008E−10, A12 = 0.00000E+00, A14 = 1.78865E−14 |
| 14 | K = 0.00000E+00, A4 = 1.34513E−05, A6 = −1.45457E−07, A8 = 1.79969E−09, A10 = 2.18279E−11, A12 = −4.62803E−13, A14 = 0.00000E+00 |
| 15 | K = 1.32446E+01, A4 = 1.18483E−04, A6 = −3.38852E−07, A8 = 1.29101E−08, A10 = −5.93769E−11, A12 = −3.58767E−13, A14 = 3.42944E−15 |

Various data

| | |
|---|---|
| Focal length | 16.4786 |
| F-number | 1.43339 |
| View angle | 33.9723 |
| Image height | 10.1000 |
| Overall length of lens system | 49.9971 |
| BF | 16.49734 |

The following Table 12 shows the values corresponding to the conditions (1) to (6) in the lens systems of the respective numerical examples.

TABLE 12

(Corresponding Values to Individual Conditions)

| | Conditions | | | | | |
|---|---|---|---|---|---|---|
| Examples | (1) | (2) | (3) | (4) | (5) | (6) |
| 1 | 0.120 | 3.297 | 1.89292 | 0.375 | −6.9% | −0.082 |
| 2 | 0.124 | 3.318 | 1.89400 | 0.376 | −7.5% | −0.117 |
| 3 | 0.115 | 2.416 | 1.84666 | 0.359 | −7.8% | −0.083 |
| 4 | 0.198 | 2.244 | 1.89635 | 0.320 | −4.8% | 0.249 |
| 5 | 0.162 | 2.417 | 1.72916 | 0.242 | −7.8% | −0.068 |
| 6 | 0.205 | 2.220 | 1.95000 | 0.261 | −3.8% | 0.307 |
| 7 | 0.191 | 2.397 | 1.88300 | 0.371 | −8.3% | 0.015 |
| 8 | 0.128 | 4.016 | 1.89196 | 0.404 | −9.4% | −0.087 |
| 9 | 0.110 | 2.887 | 1.84666 | 0.329 | −12.5% | −0.218 |
| 10 | 0.116 | 3.980 | 1.87384 | 0.356 | −11.4% | −0.128 |
| 11 | 0.102 | 3.343 | 1.88300 | 0.386 | −8.9% | −0.235 |

The lens system according to the present invention is applicable to an imaging optical system. In particular, the lens system is suitable for an imaging optical system that is applicable to an interchangeable lens or a digital still camera.

While the invention has been described in detail, the foregoing description is in all aspects illustrative and not restrictive. It is understood that numerous other modifications and variations can be devised without departing from the scope of the invention.

What is claimed is:

1. A lens system having an F number equal to or smaller than 2.4, wherein
a positive lens element is disposed closest to an object side;
a diaphragm disposed in a widest air space in the lens system;
in a rear unit including all lens elements disposed on the image side relative to the diaphragm, a lens element having a lens surface of a smallest curvature radius is a negative lens element, and a lens element having a lens surface of a second smallest curvature radius is a positive lens element;
the negative lens element and the positive lens element in the rear unit are adjacent to each other; and
the lens system satisfies the following conditions:

$$0.05 < L\_1/L\_TH < 0.21$$

$$1.5 < L\_TH/Y < 8$$

where,
L_1 is an interval from a lens surface located closest to the object side to a lens surface located on the object side relative to the diaphragm,
L_TH is an interval from the lens surface located closest to the object side to a lens surface located closest to an image side, and
Y is a maximum image height.

2. The lens system according to claim 1, wherein
a positive lens element and a negative lens element are disposed in order from the most object side toward the image side.

3. The lens system according to claim 2 satisfying the following condition:

$$0.20 < NdL1 - NdL2 < 0.45$$

where,
NdL1 is a refractive index of the positive lens element disposed closest to the object side, and
NdL2 is a refractive index of the negative lens element disposed second closest to the object side.

4. The lens system according to claim 1, wherein
two or more positive lens elements are disposed in a rear unit including all lens elements disposed on the image side relative to the diaphragm.

5. The lens system according to claim 1, wherein
in a rear unit including all lens elements disposed on the image side relative to the diaphragm, an aspheric surface is provided on a lens element closest to the image side or on a lens element second closest to the image side.

6. The lens system according to claim 1 satisfying the following condition:

$$1.70 < NdL1 < 2.4$$

where NdL1 is a refractive index of the positive lens element disposed closest to the object side.

7. The lens system according to claim 1 satisfying the following condition:

$$-16\% < Dist. < 0\%$$

where Dist. is a distortion at the maximum image height.

8. An interchangeable lens apparatus which allows the lens system according to claim 1 to be attached to a camera body via an attaching part.

9. A camera system including the interchangeable lens apparatus according to claim 8, and an image sensor.

10. A lens system having an F number equal to or smaller than 2.4, wherein
a diaphragm is disposed in a widest air space in the lens system;
two or more lens elements each has a refractive index equal to or greater than 1.85;
a positive lens element and a negative lens element are disposed in order from the most object side toward the image side;
in a rear unit including all lens elements disposed on the image side relative to the diaphragm, a lens element having a lens surface of a smallest curvature radius is a negative lens element, and a lens element having a lens surface of a second smallest curvature radius is a positive lens element;
the negative lens element and the positive lens element in the rear unit are adjacent to each other; and
the lens system satisfies the following conditions:

$$1.5 < L\_TH/Y < 8$$

$$0.20 < NdL1 - NdL2 < 0.45$$

where,
L_TH is an interval from a lens surface located closest to an object side to a lens surface located closest to an image side,
Y is a maximum image height
NdL1 is a refractive index of the positive lens element disposed closest to the object side, and
NdL2 is a refractive index of the negative lens disposed second closest to the object side.

11. The lens system according to claim 10, wherein
two or more positive lens elements are disposed in a rear unit including all lens elements disposed on the image side relative to the diaphragm.

12. The lens system according to claim 10, wherein
in a rear unit including all lens elements disposed on the image side relative to the diaphragm, an aspheric surface is provided on a lens element closest to the image side or on a lens element second closest to the image side.

13. The lens system according to claim 10 satisfying the following condition:

$$1.70 < NdL1 < 2.4$$

where NdL1 is a refractive index of the positive lens element disposed closest to the object side.

14. The lens system according to claim 10 satisfying the following condition:

$$-16\% < Dist. < 0\%$$

where Dist. is a distortion at the maximum image height.

15. An interchangeable lens apparatus which allows the lens system according to claim 10 to be attached to a camera body via an attaching part.

16. A camera system including the interchangeable lens apparatus according to claim 15, and an image sensor.

* * * * *